US010372597B2

(12) United States Patent
Alam et al.

(10) Patent No.: US 10,372,597 B2
(45) Date of Patent: Aug. 6, 2019

(54) SOFTWARE TESTING AND VERIFICATION (71) Applicant: INTERNATIONAL BUSINESS MACHINES CORPORATION, Armonk, NY (US)

(72) Inventors: Afrina Alam, Bangalore (IN); Vanisri Anil Kumar, Bangalore (IN); Soumen Chatterjee, Kolkata (IN); Rashmi M. Nagaraju, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 15/585,226

(22) Filed: May 3, 2017

(65) Prior Publication Data

US 2018/0322036 A1 Nov. 8, 2018

(51) Int. Cl.
*G06F 11/00* (2006.01)
*G06F 11/36* (2006.01)
*G06F 16/2457* (2019.01)

(52) U.S. Cl.
CPC ...... *G06F 11/3688* (2013.01); *G06F 11/3604* (2013.01); *G06F 11/3684* (2013.01); *G06F 16/24575* (2019.01)

(58) Field of Classification Search
CPC ............. G06F 11/3604; G06F 11/3684; G06F 11/3688
See application file for complete search history.

(56) References Cited

U.S. PATENT DOCUMENTS

| 9,262,404 | B2 | 2/2016 | Ingram et al. | |
|---|---|---|---|---|
| 2005/0102596 | A1* | 5/2005 | Hekmatpour | .... G01R 31/31835 714/741 |
| 2006/0184918 | A1* | 8/2006 | Rosaria | ............... G06F 11/3672 717/124 |
| 2006/0218446 | A1* | 9/2006 | Crawford | ............ G06F 11/3688 714/38.14 |
| 2014/0058740 | A1 | 2/2014 | Barnett | |
| 2018/0060226 | A1* | 3/2018 | Siggers | ............... G06F 11/3692 |

FOREIGN PATENT DOCUMENTS

WO 2014115189 7/2014

\* cited by examiner

*Primary Examiner* — Joshua P Lottich
(74) *Attorney, Agent, or Firm* — Schmeiser, Olsen & Watts; Mark C. Vallone (57) ABSTRACT

A method and system for improving automated software testing is provided. The method includes identifying software elements of a software test specification executed by a hardware device of an IT system. Existing software objects associated with a software module for testing are mapped to the identified software elements and with physical operational values of the software module. The identified software elements of the software test specification and associated software parameters are verified and software values of the identified software elements are extracted. The software values are executed with respect to a library database and the software test specification in executed with respect to the software module. In response, software module test software for operationally testing software modules and associated hardware devices is generated resulting in improved operation of the software modules and associated hardware devices.

18 Claims, 6 Drawing Sheets

SOFTWARE TESTING AND VERIFICATION

FIELD

The present invention relates generally to a method for testing software applications and in particular to a method and associated system for improving software technology associated with operationally testing software modules and associated hardware devices resulting in improved operation of the associated hardware devices.

BACKGROUND

Accurately generating instructions for verifying software typically includes an inaccurate process with little flexibility. Determining system operational solutions with respect to code may include a complicated process that may be time consuming and require a large amount of resources. Accordingly, there exists a need in the art to overcome at least some of the deficiencies and limitations described herein above.

SUMMARY

A first aspect of the invention provides an automated software testing improvement method comprising: identifying, by a processor of a hardware device of an IT system, software elements of a software test specification derived from a readable domain specific software language; first mapping, by the processor, existing software objects associated with a software module for testing with the identified software elements of the software test specification; second mapping, by the processor, the existing software objects with physical operational values of the software module; verifying, by the processor, the identified software elements of the software test specification and associated software parameters; extracting, by the processor, software values of the identified software elements via execution of software fabrication code, object lookup code, extraction and mapping code, and data retrieval code; first executing by the processor, the software values with respect to a library database; second executing by the processor based on results of the first executing, the software test specification with respect to the software module; generating, by the processor based on results of the second executing, software module test software for operationally testing software modules and associated hardware devices resulting in improved operation of the software modules and associated hardware devices; and storing, by the processor, the software test specification within a storage device.

A second aspect of the invention provides A computer program product, comprising a computer readable hardware storage device storing a computer readable program code, the computer readable program code comprising an algorithm that when executed by a processor of a hardware device of an IT system implements an automated software testing improvement method, the method comprising: identifying, by the processor, software elements of a software test specification derived from a readable domain specific software language; first mapping, by the processor, existing software objects associated with a software module for testing with the identified software elements of the software test specification; second mapping, by the processor, the existing software objects with physical operational values of the software module; verifying, by the processor, the identified software elements of the software test specification and associated software parameters; extracting, by the processor, software values of the identified software elements via execution of software fabrication code, object lookup code, extraction and mapping code, and data retrieval code; first executing by the processor, the software values with respect to a library database; second executing by the processor based on results of the first executing, the software test specification with respect to the software module; generating, by the processor based on results of the second executing, software module test software for operationally testing software modules and associated hardware devices resulting in improved operation of the software modules and associated hardware devices; and storing, by the processor, the software test specification within a storage device.

A third aspect of the invention provides a hardware device of an IT system comprising a processor coupled to a computer-readable memory unit, the memory unit comprising instructions that when executed by the computer processor implements an automated software testing improvement method comprising: identifying, by the processor, software elements of a software test specification derived from a readable domain specific software language; first mapping, by the processor, existing software objects associated with a software module for testing with the identified software elements of the software test specification; second mapping, by the processor, the existing software objects with physical operational values of the software module; verifying, by the processor, the identified software elements of the software test specification and associated software parameters; extracting, by the processor, software values of the identified software elements via execution of software fabrication code, object lookup code, extraction and mapping code, and data retrieval code; first executing by the processor, the software values with respect to a library database; second executing by the processor based on results of the first executing, the software test specification with respect to the software module; generating, by the processor based on results of the second executing, software module test software for operationally testing software modules and associated hardware devices resulting in improved operation of the software modules and associated hardware devices; and storing, by the processor, the software test specification within a storage device.

The present invention advantageously provides a simple method and associated system capable of accurately generating instructions for verifying software.

DETAILED DESCRIPTION

Figure 1:
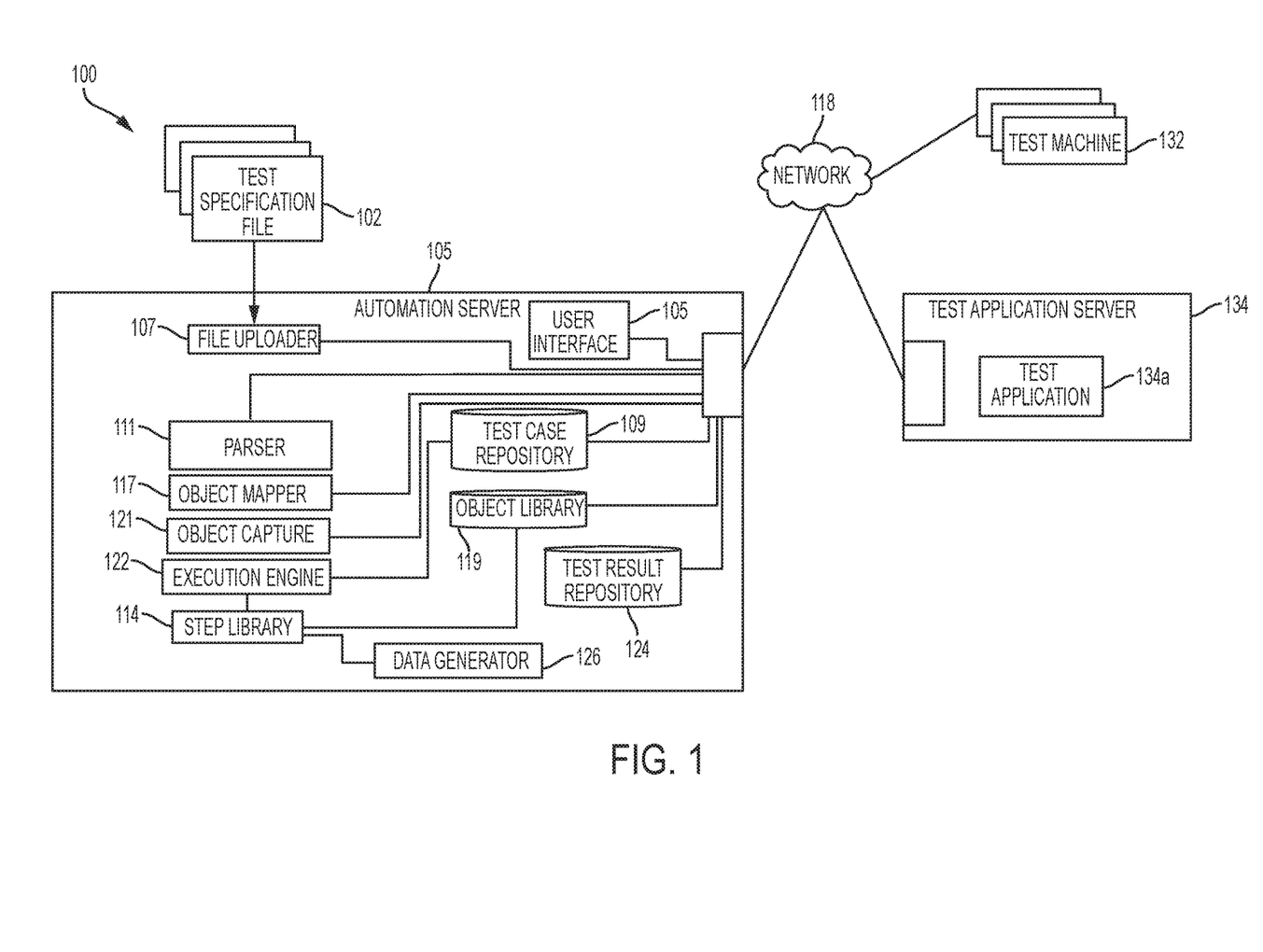
FIG. 1 illustrates a system for improving software technology associated with operationally testing software modules and associated hardware devices resulting in improved operation of the associated hardware devices, in accordance with embodiments of the present invention.

FIG. 1 illustrates a system 100 for improving software technology associated with operationally testing software modules and associated hardware devices resulting in improved operation of the associated hardware devices, in accordance with embodiments of the present invention. System 100 enables a process for improving hardware/software technology by automating the execution of test case based software and performing a context sensitive pattern matching process to map software actions, data parameters, and software objects to existing software steps from a step library database and software objects from an object repository of a target software application thereby allowing users to automate test cases for multiple hardware/software environments, target devices, and geographical regions. The aforementioned process is executed without creating any new or additional software scripts. System 100 in FIG. 1 illustrates distributed data processing components comprising an automation server (i.e., specialized hardware device(s)) 105, a test application server 134, and test machines 132 interconnected through a network 118. Additionally, system 100 includes a test specification file 102 for providing software test execution steps and associated information to system 100.

System 100 (e.g., an IT system) of FIG. 1 includes an automation server (i.e., specialized hardware device(s)) 105, a test application server 134, and test machines 132 interconnected through a network 118. Automation server 105, a test application server 134, and test machines 132 may include specialized testing circuitry/logic and a memory system. The memory system may include software applications and software code. Automation server 105, a test application server 134, and test machines 132 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, automation server 105, a test application server 134, and test machines 132 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-3. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving software technology associated with operationally testing software modules and associated hardware devices resulting in improved operation of the associated hardware devices. Network 118 may include any type of network including, inter alia, a local area network, (LAN), a wide area network (WAN), the Internet, a wireless network, etc.

Test specification file 102 comprises a textual representation of functional test scenarios for a software application. A software application may be generated and designed based on specified functional requirements, capabilities, or features. The software application may be functionally verified with respect to the specified functional requirements, capabilities, or features with respect to test specification file 102. Test specification file 102 may be generated using software test case generation technology that may vary depending on a type of software. Test specification file 102 may comprise any readable format. Alternatively, test specification file 102 may comprise behavior driven testing format such as a readable domain by specific software language. Test specification file 102 may comprise the following functional module:

1. A module for addressing a specific functional requirement for software. The module may include a functional requirement identifier and an associated definition (e.g., a feature). A feature may include multiple scenarios or possible approaches to address the feature. Scenarios may comprise a use case or alternate path and may include a scenario identifier, a description, and a list of test steps. Test steps define individual software and hardware based actions that must be performed to validate software and hardware functionality as specified by a feature with respect to a specified scenario. Each test step executes an action with respect to a target software application via usage of test data. A test step comprises a granular or composite construction but should be granular enough such that any test application may be able to analyze the test step. Additionally, the test step may be coarse enough to isolate it from application code. An action comprises a task requested to be performed. An action may comprise enabling a browser window, clicking a button, capturing text in a text field, checking a database for data, etc. Actions may vary based on a type of the software application under consideration for testing. Each action uses zero or more parameters associated with a performed action. The following parameter types are used by the test steps:

A. Literal parameters representing a static parameter value. For example, capturing the term "Henry" in a name field. In this scenario, the step specifies a data parameter which comprising the term "Henry" as an exact value for usage. No additional representations or transformations are required for literal test steps.

B. Control data parameters (CDP) comprise parameters for determining a flow of a software application. For example, in a user registration screen, there are various data elements but not all data elements contribute to the number of branches in program flow code. Therefore, all parameters affecting the program flow code are considered to be control parameters. For example, a user type may comprise a control parameter. Control parameters are required to have a valid value at the time of execution, corresponding to the target software application. Control parameters may additionally have a static reference as well as dynamic. Static control parameters (SCP) include parameters comprising a static set of values for a given software application. Dynamic control parameters (DCP) do not comprise any pre-defined set of values. Dynamic control parameters comprise parameters generated or referenced during execution of the test scenarios. Additionally, control data parameters comprising a value, are provided as part of the test specification file or read from external data files or data sources, or external data services. The control data parameters are used to modify a functionality of the application based on values of the control data parameters.

C. A software object parameter (SOP) represents actionable elements of any software application. These elements are referred to using associated logical or pseudo names in the test specification file. For example, "Click on the login button". In this case, login is the name of a button associated with a test user. An actual physical name of the button may comprise an alternative name. Additionally, an associated software element is specific to the context of an associated test case and the underlying application module. An alternative application module may include a similar name representing a completely different element.

D. A fabrication data parameter (FDP) is executed to using regular expressions or data types used by a data fabrication engine to generate test data for an associated field/parameter during run time. Generation of this data may be software application and domain specific.

E. A variable parameter comprises a parameter type defined by a user device to point to context of a single or associated test cases or scenarios under a test specification. For example, a client id generated from a create client test case may be used as a variable for the use of a next test case where client data is retrieved and viewed. Such objects are defined and assigned during the scope of execution and can only be referred or used by the test scenarios under a single test specification file for a single execution.

F. A form data parameter (FDP) executes a process for correlating a user interface with a database table with respect to a data driven UI.

Test specification file 102 may additionally comprise a functional module for addressing data parameters attached to a scope (e.g., a visibility level). A visibility level is executed to determine whether the data parameters are accessible by alternative software applications, modules, or test cases. A visibility level global represents the data parameter can be referred or used by all different applications registered with the test automation engine. Visibility level Application represents data parameters can only be referred or used by various modules of the same application. Visibility level Module represents data parameters can only be referred by a specific module of an application. A visibility level additionally enables a resolution for an actual value of the data parameters from automation context code during runtime or simulation execution.

Test specification file 102 may additionally comprise a functional module for addressing data parameters attached to a scope (e.g., a visibility level). A visibility level is executed to determine whether the data parameters are accessible by alternative software applications, modules, or test cases. A visibility level global represents the data parameter can be referred or used by all different applications registered with the test automation engine. Visibility level Application represents data parameters can only be referred or used by various modules of the same application. A visibility level module represents data parameters that may only be referred by a specific module of an application. A visibility level additionally enables a resolution for an actual value of the data parameters from automation context code during runtime or simulation execution.

Automation server 105 comprises various modules for performing specific tasks or activities to support end to end hardware automation. File uploader component 107 comprises a program module for reading a test specification file and saving the file in a test case repository under a certain application, feature, or scenario with a specified version number. A user interface based application allows a test analysis program to load data files and associate them to an application. Associated functionality is exposed as an API for system to system communication without any manual intervention. Test case repository 109 comprises a controlled repository of test cases associated to an application, feature, or capability etc. Additionally, test case repository 109 manages various profile and non-functional parameters applicable to a test case. Parser module 111 comprises a natural language parser for decomposing a test specification file into a structured format by identifying various components of the test specification file such as a feature, scenario, test case step, type of action, data parameters, UI elements or objects, etc. Parser module 111 leverages the power of natural language processing to identify the context of a statement to identify the actual intent or action and maps it with the pre-defined action library for the specific type of the software application.

Step library component 114 comprises a pre-defined repository of actions for a target application type. Associated actions may be added and/or modified. Step library component 114 comprises several predefined step execution software programs corresponding to each action for a specific type of software application. Step library component 114 may be enriched with additional or custom steps to provide flexibility and extensibility. An additional adapter component may be enabled to integrate with different underlying automation technologies. Therefore, when a new technology is released or updated and the adapter component is modified, step library component 114 is automatically executed. An associated step execution program analyzes input parameters and based on an associated type, a value is extracted. If a parameter comprises a literal parameter, an exact value is passed. If a parameter comprises an object parameter, an object value is read from an object library based on an application name, a current module context, an index position, etc. If the parameter type comprises a fabrication data parameter, it is enabled to retrieve the generated or fabricated data. If the parameter type comprises a variable, the data is extracted from the current context. If the parameter type comprises data, then a value is extracted from the pre-configured data repository for the application via usage of the variable name and number required. The test execution program establishes a connection to the test application over a network via test machines. The test machines comprise physical or virtual machines used for the execution of the test automation. Step library component 114 additionally saves results of the execution in the test result repository further enabled for reporting and additional integration perspective.

Object mapper program module 117 comprises an intelligent object identification engine that creates mapping between data parameters or application elements as defined in a test specification file with the actual field or control of a software application. Object mapper program module 117 comprises learning enabled intelligent code for determining a type for the (target) software application and applying associated mapping techniques for individual element types. Additionally, Object mapper program module 117 enables context for the test cases execute by leveraging power automated simulation engine software comprised by an execution engine module. Object mapper program module 117 additionally provides a user interface for performing manual overrides with respect to a software object capture process. If a software object mapping process is incorrect cannot not be performed, object mapper program module 117 allows test analysts to manually perform a mapping process and simultaneously captures a new software based rule in the background thereby allowing an associated software tool to address similar problems in the future. Object mapper program module 117 additionally delivers powerful programming interfaces or APIs for easy integration with any other module or portion of the software application.

Figure 5:
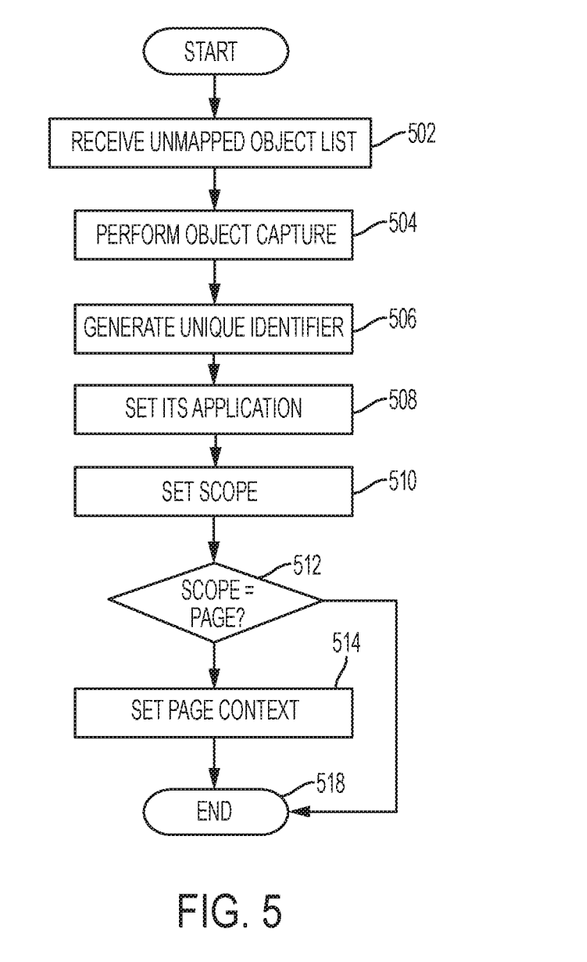
FIG. 5 illustrates an algorithm detailing a process flow enabled by the system of FIG. 1 for executing an object capture, in accordance with embodiments of the present invention

Object capture component 121 maps unmapped software objects with associated physical attribute values as described, infra, with respect to FIG. 5. Object mappings are stored in an object library for subsequent test execution cycles. Object library component 119 comprises a repository for maintaining all object mappings. Object library component 119 maintains mapping between a pseudo name of a software object as defined in the test specification file and an actual software object or element for a target software application. For example, with respect to a test step stating that "a user clicks on a login button in the login screen", a login button is a software object. Likewise, a login screen is another software object of type module or module. The login button may be identified as an element associated with a Module or software module. Additionally, the login button may not be identified with respect to a login name for the software application. Likewise, a login screen does not identify an automation system therefore, a URL. object library maintains software object mappings at various levels such as, inter alia, a global level, an application level, a module level, a local level, a temporary level, etc. A global software object may be used or referred by any additional software application or test case such as a Web browser. Software application level objects are only accessible via specified software applications. Software module level objects are only accessible via a specified module in a software application.

Execution engine program module 122 automates the execution of one or many test cases as well as test specifications associated to an application in a single or multiple target machines. Execution engine program module 122 additionally leverages object mapper program module 117 for identifying target software objects in the software application. Additionally, execution engine program module 122 enables a pre-defined action or step library to execute an action. A data generator may be executed to fabricate data for the execution of test cases. Execution engine program module 122 additionally provides a light-weight version as a simulation engine used by object mapper program module 117 in the background. Execution engine program module 122 maintains a test execution context and associates the software objects and actions with associated context. Execution engine program module 122 determines a target execution platform or test machine out of registered test machines based on non-functional parameters associated with a test case.

Data manager component 126 comprises a program module that uses powerful data fabrication capabilities to generate test data in the runtime based on the pre-defined data rules specific to a domain type. Data manager component 126 enables a process for: adding additional or new data rules or modifying existing data rules for each software application. Additionally, data manager component 126 integrates with distributed data sources, data services, or data APIs to provide required data for a test case.

Test result repository 124 maintains an outcome of test execution in a structured format.

Test machines 132 comprise target machines (physical or virtual) used to execute the test cases. The test cases will be running on these machines. Each machine may comprise a different configuration which may be dynamically determined by non-functional parameters associated to the test case. Test machines 132 are registered to the automation system. Test machines may be physical or virtual, local or remote, single instance or multi-instance, cumulous or distributed, etc.

Test Application 134a represents a target application subjected to be tested. The test application 134a runs on a test application server 134. Test Application 134a runs on a test application server that may vary between test environments or geography. Test Application 134a is registered with an automation system and may be associated with one or multiple environments and/or geographical locations. Each test Application 134a is registered with a unique name. A test application is accessible via an underlying network from the test machines.

Figure 2:
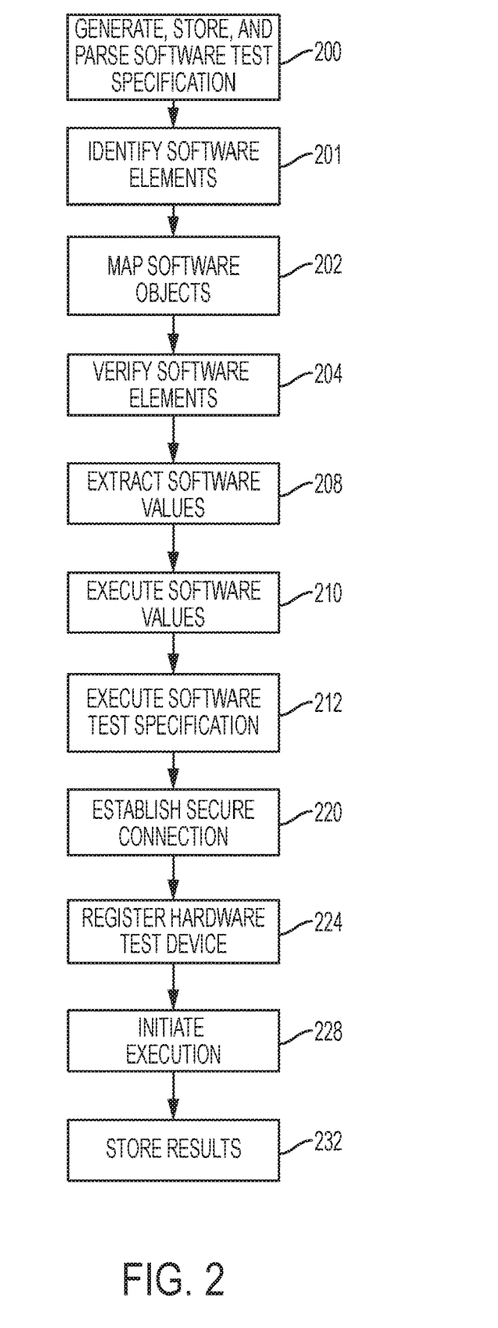
FIG. 2 illustrates an algorithm detailing a process flow enabled by the system of FIG. 1 for improving software technology associated with operationally testing software modules and associated hardware devices resulting in improved operation of the associated hardware devices, in accordance with embodiments of the present invention.

FIG. 2 illustrates an algorithm detailing a process flow enabled by system 100 of FIG. 1 for improving software technology associated with operationally testing software modules and associated hardware devices resulting in improved operation of the associated hardware devices, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by automation server 105, test application server 134, and test machines 132 of FIG. 1. In step 200, a software test specification (derived from a readable domain specific software language) is generated, stored, and parsed. In step 201, software elements of the software test specification are identified. In step 202, existing software objects associated with a software module for testing are mapped to the identified software elements of the software test specification and physical operational values of the software module. In step 204, the software elements and associated software parameters are verified. In step 208, software values of the identified software elements are extracted via execution of software fabrication code, object lookup code, extraction and mapping code, and data retrieval code. In step 210, the software values are executed with respect to domain specific value generation code. After all software elements are mapped successfully, step 212, executes the software test specification with respect to the software module. Additionally, a software module may be generated for operationally testing software modules and associated hardware devices resulting in improved operation of the software modules and associated hardware devices. The software test specification is stored within a storage device. In step 220, a secure connection between the software test specification and a hardware test device is established. In step 224, the hardware test device is registered with a distributed server system. In step 228, the software test specification is executed with respect to the software module. In step 232, results of the execution of step 228 are stored.

Figure 3:
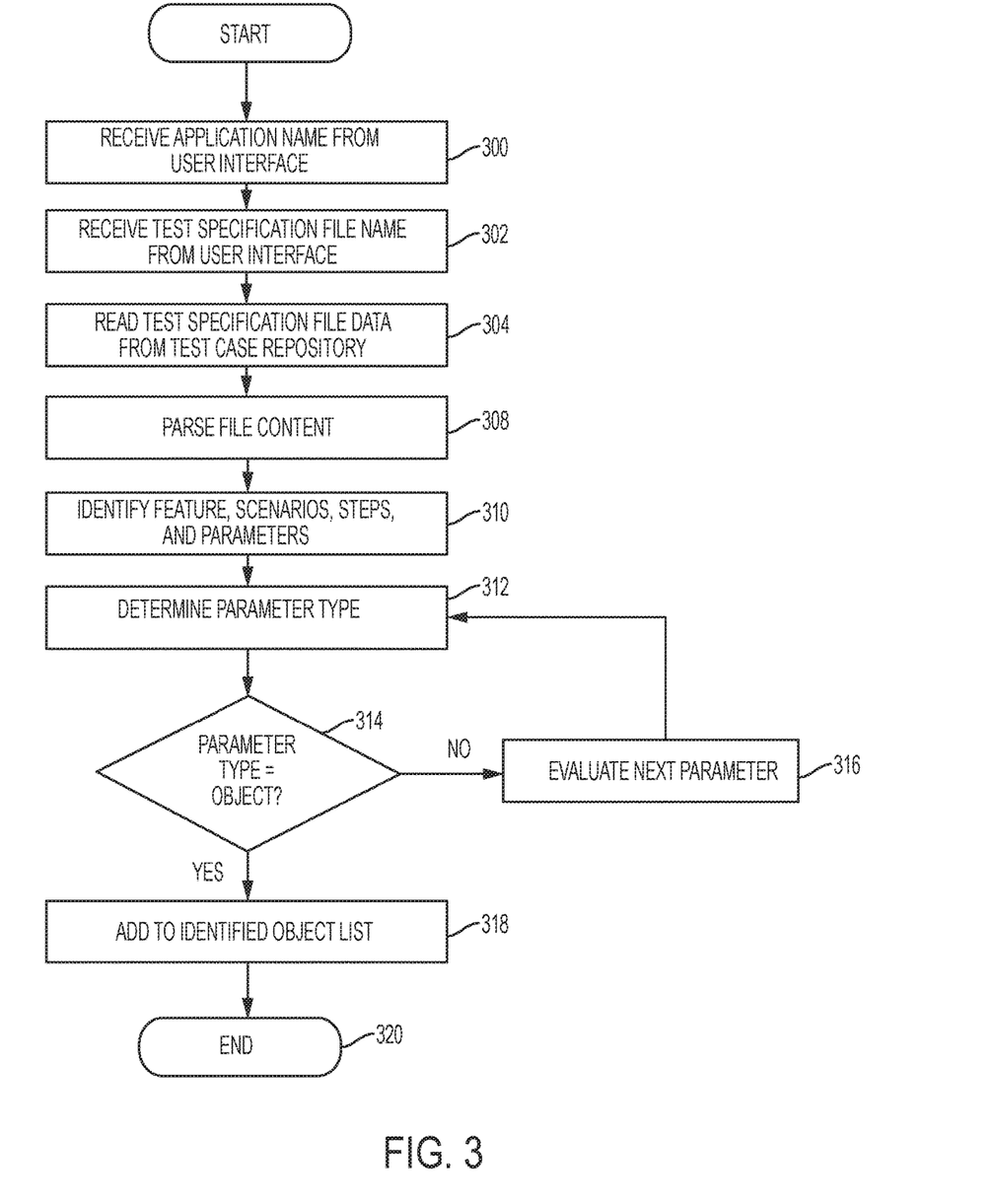
FIG. 3 illustrates an algorithm detailing a process flow enabled by the system of FIG. 1 for executing a parser component, in accordance with embodiments of the present invention.

FIG. 3 illustrates an algorithm detailing a process flow enabled by system 100 of FIG. 1 for executing a parser component (parser component 111 of FIG. 1) to parse test specification file content and identify software elements including features, scenarios, steps, and parameters, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by automation server 105, test application server 134, and test machines 132 of FIG. 1. The parser component is executed when it is triggered from a user interface or file uploader program. In steps 300 and 302, the parser component retrieves an application name and a test specification file name. Additionally, the parser component may be invoked via service components or APIs. The parser component uses input information to retrieve test specification file content from the test case repository in step 304. In step 308, the parser component parses content of the specification file and in step 310 identifies various elements of the specification file including features, scenarios, steps, and parameters. In step 312, a type for each parameter is determined in step 314, it is determined if a parameter type is identified as an object. If in step 314, it is determined that a parameter type is identified as an object then in step 318, the parameter is added to an identified object list such that each object is associated with a scenario, a feature, an application, and a module. The list may comprise multiple objects with a same name associated with a same or multiple scenario(s). Each object is additionally enriched with its index position determined by the parser component based on its appearance in the scenario. In if step 314, it is determined that a parameter type is not identified as an object then in step 316 a next parameter is evaluated via execution of step 312.

Figure 4:
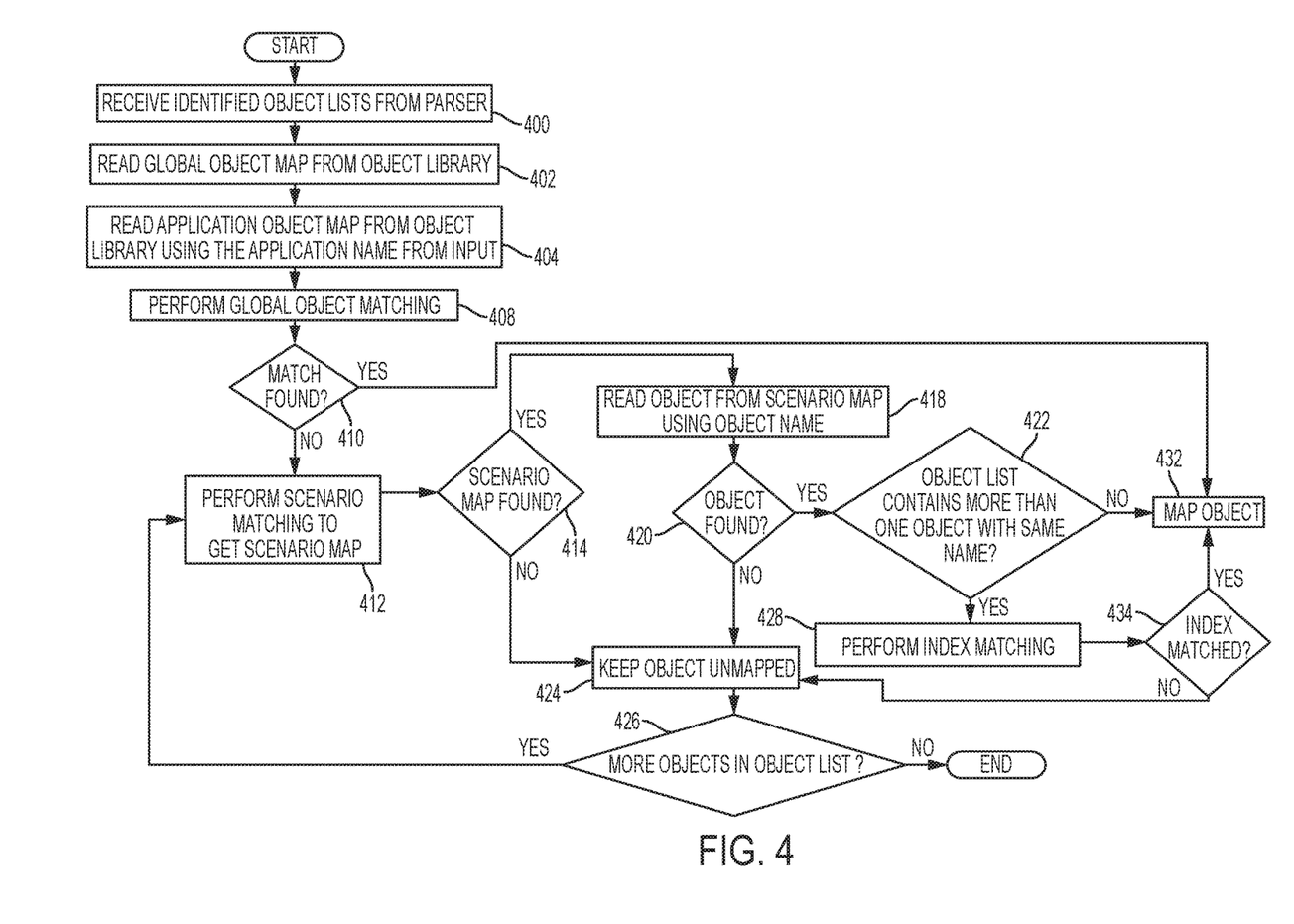
FIG. 4 illustrates an algorithm detailing a process flow enabled by the system of FIG. 1 for executing an object mapper component, in accordance with embodiments of the present invention.

FIG. 4 illustrates an algorithm detailing a process flow enabled by system 100 of FIG. 1 for executing an object mapper component (object mapper component 117 of FIG. 1) to map identified software objects with object present in an object library, in accordance with embodiments of the present invention. Each of the steps in the algorithm of FIG. 4 may be enabled and executed in any order by a computer processor(s) executing computer code. Additionally, each of the steps in the algorithm of FIG. 4 may be enabled and executed in combination by automation server 105, test application server 134, and test machines 132 of FIG. 1. Object mapper component is executed when the parser component completes a process for identification of the software objects from the test specification files and transmits identified object list to the object mapper component receiving the object list in step 400. The object list comprises a list of objects. Each of the objects contains application name, scenario name, object name, index position comprising a hierarchical representation of the test specification file. The aforementioned process comprises an automatic invocation. In steps 402, 404, and 408, the object mapper component retrieves the global object map from the object library database and retrieves the application object map using an inputted application name. For each object in the object list, the object mapper component executes mapping tasks. In step 410, the object mapper component determines the software object is located in the global object map. If in step 410, the object mapper component determines the software object is located in the global object map then in step 432, the input object is mapped with a global object and the mapping is updated in the object library. If in step 410, the object mapper component determines the software object is not located in the global object map, then in step 412, the object is matched to a scenario map in steps 414, 418, and 420 and if the match is not located then in step 424, the object is marked as unmapped. In step 422, the object mapper component determines if more than one object exists in the incoming object list with a same object name and a matching algorithm reviews an index position to locate a correct match in steps 428 and 434. If a match is not located then the object is marked as unmapped in step 424. In step 426, individual references for the software object in the object list may point to a single object or different objects based on context of the scenario and feature. The parser component associates all identified objects with the software application, test specification, feature or capability, scenario, or test case. As the module of the application is modified with respect to a scenario, the software objects are associated to a module of the software application. When the similar object references are located for a similar module, the object mapper component automatically generates a mapping using natural language processing and context analysis capabilities to determine if the object name referred in the test step refers to an existing object.

FIG. 5 illustrates an algorithm detailing a process flow enabled by system 100 of FIG. 1 for executing an object capture component (object capture component 121 of FIG. 1) to map unmapped software objects with associated physical attribute values, in accordance with embodiments of the present invention. Each of the steps in the algorithm of FIG. 5 may be enabled and executed in any order by a computer processor(s) executing computer code. Additionally, each of the steps in the algorithm of FIG. 5 may be enabled and executed in combination by automation server 105, test application server 134, and test machines 132 of FIG. 1. Object mapper component is executed automatically for each unmapped software object to define automatically. Each object in an application may be defined by a specific set of means thereby defining object identification patterns specific to a type of software application. The object mapping software module uses a library of pre-defined mapping rules supporting augmentation and learning techniques to locate software elements by leveraging one or many such patterns. All object mappings for a software application are stored in an object library (e.g., object library 119 of FIG. 1). In step 502, an unmapped software object list is received by an automation server. In step 504, a software object capturing process is executed and an object locator capability software is enabled (via a test application) to retrieve an actual value of the software object and generate a unique identifier in step 506. In step 508, all the software objects are saved as a global object, an application object, a local object, or a module object. A module object is only accessible by specific module or software modules or scenarios associated with the module. Local or temporary objects are only available for a single execution context. In step 510, an object scope for the software object is set and it is determined if the object scope is marked as a module object in step 512. If the software object is marked as a module object, the software object is associated with an existing module or a new module in step 514 otherwise the process is terminated. Modules are additionally considered as software objects. Application objects and are additionally saved in the object library for the software application. Application objects may be environmental or regional specific and associated values may be mapped. The object capture component parses a target application module or associated modules to determine software object mapping. A predefined set of patterns are enabled for each individual element of a Web or mobile platform to perform the aforementioned matching. If a match is not determined for any software object or the matching identified requires correction, a manual override is enabled via an object capture UI. When a mapping process is captured, a program inspection module determines a new pattern for identifying objects associated for a software type or category and enriches a mapping identification patterns library so that similar patterns may be applied for future processes. The aforementioned software object library capability allows an automation engine to be used for multiple software applications across multiple software environments and regions.

Figure 6:
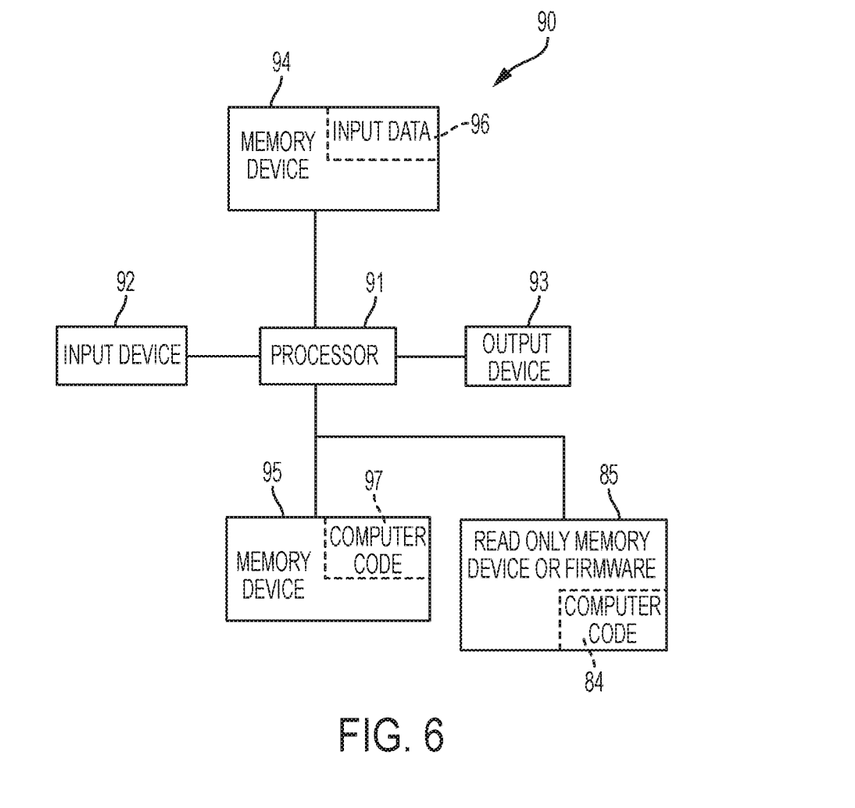
FIG. 6 illustrates a computer system used by the system of FIG. 1 for improving software technology associated with operationally testing software modules and associated hardware devices resulting in improved operation of the associated hardware devices, in accordance with embodiments of the present invention.

FIG. 6 illustrates a computer system 90 (e.g., automation 105, test application server 134, test machines 132 of FIG. 1) used by or comprised by the system of FIG. 1 for improving software technology associated with operationally testing software modules and associated hardware devices resulting in improved operation of the associated hardware devices, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for improving software technology associated with operationally testing software modules and associated hardware devices resulting in improved operation of the associated hardware devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2-5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms of FIGS. 2-5) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to for improve software technology associated with operationally testing software modules and associated hardware devices resulting in improved operation of the associated hardware devices. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with operationally testing software modules and associated hardware devices resulting in improved operation of the associated hardware devices. In another embodiment, the invention provides a business method that performs the process steps of the invention on a subscription, advertising, and/or fee basis. That is, a service supplier, such as a Solution Integrator, could offer to enable a process for improving software technology associated with operationally testing software modules and associated hardware devices resulting in improved operation of the associated hardware devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated software testing method comprising:
   identifying, by a processor of a hardware device of an IT system, software elements of a software test specification derived from a readable domain specific software language;
   first mapping, by said processor, existing software objects associated with a software module for testing with said identified software elements of said software test specification;
   second mapping, by said processor, said existing software objects with physical operational values of said software module;
   verifying, by said processor, said identified software elements of said software test specification and associated software parameters;
   extracting, by said processor, software values of said identified software elements via execution of software fabrication code, object lookup code, extraction and mapping code, and data retrieval code;
   first executing by said processor, said software values with respect to a library database;
   second executing by said processor based on results of said first executing, said software test specification with respect to said software module;
   generating, by said processor based on results of said second executing, software module test software for operationally testing software modules and associated hardware devices resulting in improved operation of said software modules and associated hardware devices, wherein said improved operation of said software modules and said associated hardware devices comprises an improved processing speed for a processor of said associated hardware devices; and storing, by said processor, said software test specification within a storage device.

2. The method of claim 1, further comprising:

retrieving, by said processor from said storage device, said software test specification;

establishing, by said processor, a secure connection between said software test specification and a hardware test device;

registering, by said processor, said hardware test device with a distributed server system; and initiating, by said processor via said hardware test device, said second executing.

3. The method of claim 1, wherein said hardware test device comprises a device selected form the group consisting of a local hardware device, a remote physical hardware device, and a virtual test machine.

4. The method of claim 1, wherein said identifying said software elements comprises:

identifying software features, said test steps, software improvement actions, said associated software parameters, and said existing software objects via execution of pattern matching software code.

5. The method of claim 1, wherein said first mapping comprises:

executing global object mapping code, scenario matching code, index matching code, and context analysis technique code resulting in modification of existing transformation and mappings rules code.

6. The method of claim 1, wherein said second mapping comprises:

automatically detecting software code elements of said software module by parsing and evaluating elements of said software module and applying object identification patterns each element of said elements for said software module with said software test specification.

7. The method of claim 1, wherein said second executing comprises:

dynamically generating test data during runtime;

reading an actual value for an object of said existing software objects;

generating a database associated with said software module test application, said database comprising features and modules of said software module test application;

reading an actual value for a variable from current automation context of said software module test application; and reading values of the data parameters from external hardware sources.

8. The method of claim 1, wherein said improved operation of said software modules and said associated hardware devices further comprises an improved memory structure of said associated hardware devices, and wherein said improved memory structure enables an improved access speed for accessing data within said improved memory structure via an internal layered structure of said improved memory structure.

9. The method of claim 1, further comprising:

providing at least one support service for at least one of creating, integrating, hosting, maintaining, and deploying computer-readable code in the control hardware, said code being executed by the computer processor to implement: said identifying, said first mapping, said second mapping, said verifying, said extracting, said first executing, said second executing, said generating, and said storing.

10. A computer program product, comprising a non-transitory computer readable hardware storage device storing a computer readable program code, said computer readable program code comprising an algorithm that when executed by a processor of a hardware device of an IT system implements an automated software testing method, said method comprising:

identifying, by said processor, software elements of a software test specification derived from a readable domain specific software language;

first mapping, by said processor, existing software objects associated with a software module for testing with said identified software elements of said software test specification;

second mapping, by said processor, said existing software objects with physical operational values of said software module;

verifying, by said processor, said identified software elements of said software test specification and associated software parameters;

extracting, by said processor, software values of said identified software elements via execution of software fabrication code, object lookup code, extraction and mapping code, and data retrieval code;

first executing by said processor, said software values with respect to a library database;

second executing by said processor based on results of said first executing, said software test specification with respect to said software module;

generating, by said processor based on results of said second executing, software module test software for operationally testing software modules and associated hardware devices resulting in improved operation of said software modules and associated hardware devices, wherein said improved operation of said software modules and said associated hardware devices comprises an improved processing speed for a processor of said associated hardware devices; and storing, by said processor, said software test specification within a storage device.

11. The computer program product of claim 10, wherein said method further comprises:

retrieving, by said processor from said storage device, said software test specification;

establishing, by said processor, a secure connection between said software test specification and a hardware test device;

registering, by said processor, said hardware test device with a distributed server system; and initiating, by said processor via said hardware test device, said second executing.

12. The computer program product of claim 10, wherein said hardware test device comprises a device selected form the group consisting of a local hardware device, a remote physical hardware device, and a virtual test machine.

13. The computer program product of claim 10, wherein said identifying said software elements comprises:

identifying software features, said test steps, software improvement actions, said associated software parameters, and said existing software objects via execution of pattern matching software code.

14. The computer program product of claim 10, wherein said first mapping comprises:

executing global object mapping code, scenario matching code, index matching code, and context analysis technique code resulting in modification of existing transformation and mappings rules code.

15. The computer program product of claim 10, wherein said second mapping comprises:
    automatically detecting software code elements of said software module by parsing and evaluating elements of said software module and applying object identification patterns each element of said elements for said software module with said software test specification.

16. The computer program product of claim 10, wherein said second executing comprises:
    dynamically generating test data during runtime;
    reading an actual value for an object of said existing software objects;
    generating a database associated with said software module test application, said database comprising features and modules of said software module test application;
    reading an actual value for a variable from current automation context of said software module test application; and
    reading values of the data parameters from external hardware sources.

17. The computer program product of claim 10, wherein said improved operation of said software modules and said associated hardware devices further comprises an improved memory structure of said associated hardware devices, and wherein said improved memory structure enables an improved access speed for accessing data within said improved memory structure via an internal layered structure of said improved memory structure.

18. A hardware device of an IT system comprising a hardware processor coupled to a hardware computer-readable memory unit, said memory unit comprising instructions that when executed by the computer processor implements an automated software testing method comprising:
    identifying, by said hardware processor, software elements of a software test specification derived from a readable domain specific software language;
    first mapping, by said hardware processor, existing software objects associated with a software module for testing with said identified software elements of said software test specification;
    second mapping, by said hardware processor, said existing software objects with physical operational values of said software module;
    verifying, by said hardware processor, said identified software elements of said software test specification and associated software parameters;
    extracting, by said hardware processor, software values of said identified software elements via execution of software fabrication code, object lookup code, extraction and mapping code, and data retrieval code;
    first executing by said hardware processor, said software values with respect to a library database;
    second executing by said hardware processor based on results of said first executing, said software test specification with respect to said software module;
    generating, by said hardware processor based on results of said second executing, software module test software for operationally testing software modules and associated hardware devices resulting in improved operation of said software modules and associated hardware devices, wherein said improved operation of said software modules and said associated hardware devices comprises an improved processing speed for a processor of said associated hardware devices; and
    storing, by said hardware processor, said software test specification within a storage device.

* * * * *